US011463616B1

(12) United States Patent
Neves Creto et al.

(10) Patent No.: US 11,463,616 B1
(45) Date of Patent: Oct. 4, 2022

(54) AUTOMATICALLY ACTIVATING A MIRROR MODE OF A COMPUTING DEVICE

(71) Applicant: Motorola Mobility LLC, Chicago, IL (US)

(72) Inventors: Alexandre Neves Creto, São Paulo (BR); Olivier David Meirhaeghe, Lincolnshire, IL (US); Rahul Bharat Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/473,521

(22) Filed: Sep. 13, 2021

(51) Int. Cl.
*H04N 5/232* (2006.01)
(52) U.S. Cl.
CPC ......... *H04N 5/23219* (2013.01); *H04N 5/232* (2013.01); *H04N 5/23225* (2013.01); *H04N 5/23245* (2013.01); *H04N 5/232933* (2018.08)

(58) Field of Classification Search
CPC ........... H04N 1/00928; H04N 1/00954; H04N 5/23219; H04N 5/23245; H04N 5/232933; H04N 5/23225; H04W 4/021; H04W 4/022
See application file for complete search history.

(56) References Cited

U.S. PATENT DOCUMENTS

| 2020/0050416 A1* | 2/2020 | Myung ..................... G06F 1/16 |
| 2021/0132795 A1* | 5/2021 | Kurbanova ......... G06F 3/04886 |
| 2022/0006950 A1* | 1/2022 | Wang ................. H04N 5/23219 |

* cited by examiner

*Primary Examiner* — Daniel M Pasiewicz
(74) *Attorney, Agent, or Firm* — FIG. 1 Patents

(57) ABSTRACT

An automatic mirror mode system determines when a user is facing a display device and is close to the display device, and when the intent of the user is to activate a mirror mode of the computing device. In response to determining that the user is facing the display device and is close to the display device, and that the intent of the user is to activate a mirror mode of the computing device, the computing device automatically enters the mirror mode. In the mirror mode, one or more images are captured using a front-facing camera and are displayed on the display device. This allows the user to, for example, check his teeth or hair before meeting someone, entering a meeting, and so forth.

20 Claims, 5 Drawing Sheets

AUTOMATICALLY ACTIVATING A MIRROR MODE OF A COMPUTING DEVICE

BACKGROUND

As technology has advanced computing devices, such as cell phones, have become commonplace in our lives. These computing devices provide various functionality, such as allowing us to take pictures and videos. While this functionality provides numerous benefits, it is not without its problems. One such problem is that it can be difficult for a user to quickly and easily get to particular functionality, such as to start viewing images of pictures captured by a camera of the computing device. For example, opening the viewfinder of the camera of the computing device can require multiple user inputs, such as gestures, button selections, and so forth. These problems can be frustrating for users, leading to user frustration with their devices.

BRIEF DESCRIPTION OF THE DRAWINGS

Embodiments of automatically activating a mirror mode of a computing device are described with reference to the following drawings. The same numbers are used throughout the drawings to reference like features and components.

DETAILED DESCRIPTION

Automatically activating a mirror mode of a computing device is discussed herein. Generally, a computing device (e.g., a mobile phone) includes a display device and a camera system with a front-facing camera. The computing device includes an automatic mirror mode system that determines when a user is facing the display device and is close to the display device. The automatic mirror mode system also determines when the intent of the user is to activate a mirror mode of the computing device. The intent of the user can be determined based on various different information, such as detection of facial interactions by the user (e.g., showing their teeth, stroking their hair, playing with their beard or moustache, puffing their eyebrows, looking deep into their eyes), determining that a current time is just prior to an upcoming event (e.g., meeting, appointment, conference call), determining that a current location of the computing device is one of various particular types of locations (e.g., right before the entrance of a meeting room, right before the entrance of a house, right before the entrance of party hall, right before the entrance of a mall), and so forth.

In response to determining that the user is facing the display device and is close to the display device, and that the intent of the user is to activate a mirror mode of the computing device, the computing device automatically enters the mirror mode. In the mirror mode one or more images are captured using the front-facing camera and are displayed on the display device. This allows the user to, for example, check his teeth or hair before meeting someone, entering a meeting, and so forth.

In contrast to traditional camera system activation techniques, the techniques discussed herein automatically detect when to enter the mirror mode without requiring the user to input a gesture, button selection, and so forth to the computing device requesting to activate mirror mode. Rather, by monitoring the position of the display device of the computing device (e.g., determining that the user is facing the display device and is close to the display device), and that the intent of the user is to activate the mirror mode (e.g., based on facial interactions, scheduling data, or location data), the computing device automatically enters the mirror mode.

The techniques discussed herein improve the operation of a computing device by automatically determining the intent of the user to use his computing device as a mirror and automatically entering a mirror mode in which the front-facing camera captures images for display to the user. The user need not navigate through multiple screens, buttons, gestures, and so forth to enter the mirror mode. Furthermore, the user need not provide any user input to the computing device at all to enter the mirror mode—the user can simply pick up and look at the display of the computing device.

Figure 1:
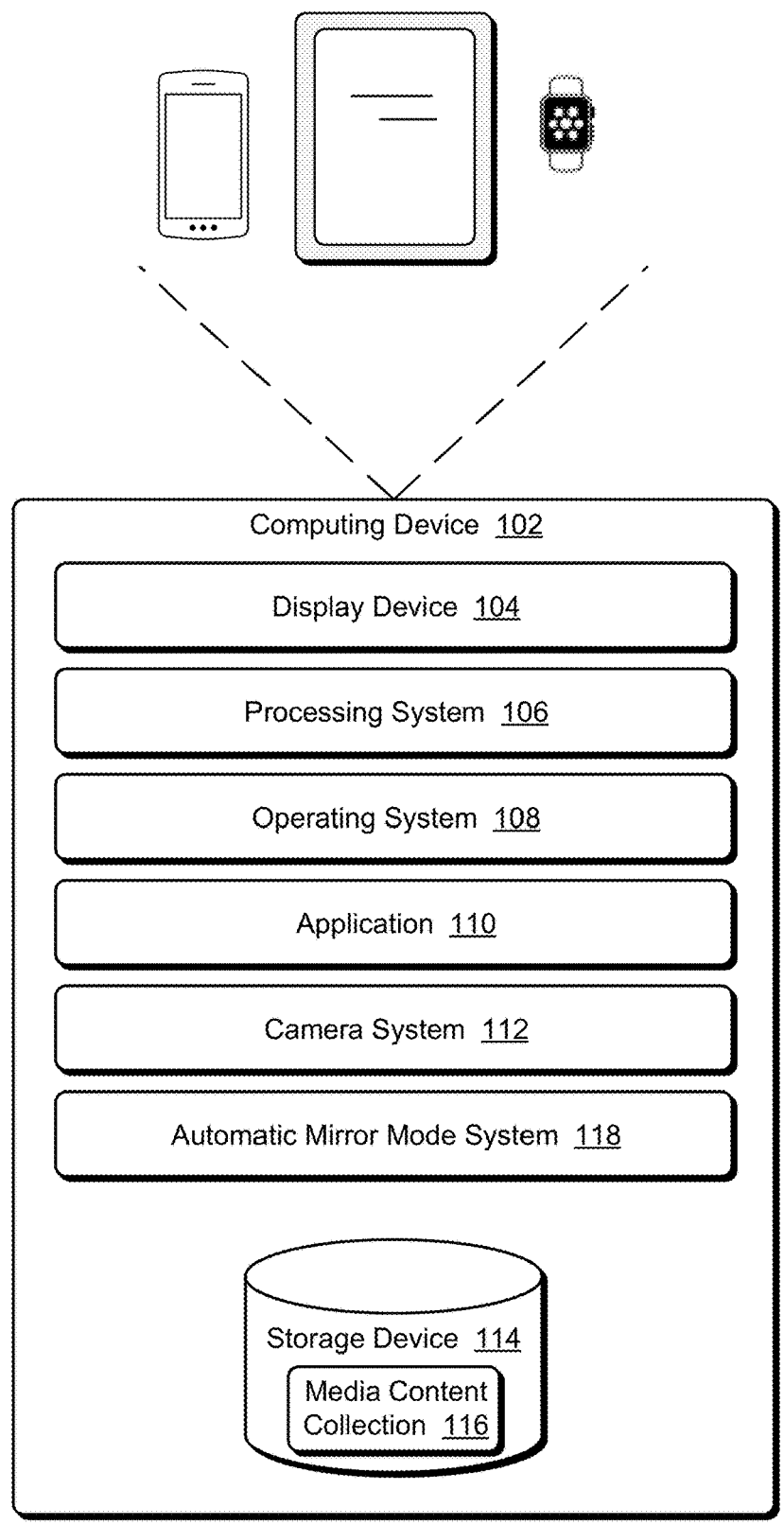
FIG. 1 illustrates an example computing device implementing the techniques discussed herein.

FIG. 1 illustrates an example computing device 102 implementing the techniques discussed herein. The computing device 102 can be, or include, many different types of computing or electronic devices. For example, the computing device 102 can be a smartphone or other wireless phone, a tablet or phablet computer, a notebook computer (e.g., netbook or ultrabook), a laptop computer, a wearable device (e.g., a smartwatch), a personal media player, a personal navigating device (e.g., global positioning system), an entertainment device (e.g., a portable gaming device, a streaming media player, a digital video recorder, a music or other audio playback device), a video camera, an Internet of Things (IoT) device, an automotive computer, and so forth.

The computing device 102 includes a display device 104. The display device 104 can be configured as any suitable type of display, such as an organic light-emitting diode (OLED) display, active matrix OLED display, liquid crystal display (LCD), in-plane shifting LCD, projector, and so forth. Although illustrated as part of the computing device 102, it should be noted that the display device 104 can be implemented separately from the computing device 102. In such situations, the computing device 102 can communicate with the display device 104 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. The display device 104 can also optionally operate as an input device (e.g., the display device 104 can be a touchscreen display).

The computing device 102 also includes a processing system 106 that includes one or more processors, each of which can include one or more cores. The processing system 106 is coupled with, and may implement functionalities of, any other components or modules of the computing device 102 that are described herein. In one or more embodiments, the processing system 106 includes a single processor having a single core. Alternatively, the processing system 106 includes a single processor having multiple cores or multiple processors (each having one or more cores).

The computing device 102 also includes an operating system 108. The operating system 108 manages hardware, software, and firmware resources in the computing device 102. The operating system 108 manages one or more applications 110 running on the computing device 102, and operates as an interface between applications 110 and hardware components of the computing device 102.

The computing device 102 also includes a camera system 112. The camera system 112 captures images digitally using any of a variety of different technologies, such as a charge-coupled device (CCD) sensor, a complementary metal-oxide-semiconductor (CMOS) sensor, combinations thereof, and so forth. The camera system 112 can include a single sensor and lens, or alternatively multiple sensors or multiple lenses. In one or more implementations, the camera system 112 includes at least one lens and sensor positioned to capture images from the same surface of the computing device 102 as the display device 104 is positioned on). For example, the camera system 112 may have at least one front-facing camera that includes a lens and sensor positioned to capture images from the front of the computing device 102 (e.g., the same surface as the display device 104 is positioned on), and at least one additional camera that includes a lens and sensor positioned to capture images from the back (or another side) of the computing device 102.

The camera system 112 can capture still images as well as video. The media content discussed herein refers to one or both of still images and video. The captured images or video are optionally stored in a storage device 114 as a media content collection 116. The storage device 114 can be implemented using any of a variety of storage technologies, such as magnetic disk, optical disc, Flash or other solid state memory, and so forth. The storage device 114 can store various program instructions and data for any one or more of the operating system 108 and application 110.

The computing device 102 also includes an automatic mirror mode system 118. The automatic mirror mode system 118 determines when a user is facing the display device 104 (e.g., facing the front of the computing device 102) and is close to the display device 104. The automatic mirror mode system 118 also determines when the intent of the user is to activate a mirror mode of the computing device 102. In response to determining that the user is facing the display device 104 and that the intent of the user is to activate a mirror mode of the computing device 102, automatic mirror mode system 118 enters the mirror mode. In the mirror mode, one or more images are captured using a front-facing camera of the camera system 112 and are displayed on the display device 104. This allows the user to, for example, check his teeth or hair before meeting someone, before entering a meeting, and so forth.

The automatic mirror mode system 118 can be implemented in a variety of different manners. For example, the automatic mirror mode system 118 can be implemented as multiple instructions stored on computer-readable storage media and that can be executed by the processing system 108. E.g., the storage device 114 can store various program instructions and data for the automatic mirror mode system 118. Additionally or alternatively, the automatic mirror mode system 118 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth). Furthermore, although illustrated as separate from the operating system 108, the automatic mirror mode system 118 can be implemented at least in part as part of the operating system 108.

The computing device 102 also includes a storage device 114. The storage device 114 can be implemented using any of a variety of storage technologies, such as magnetic disk, optical disc, Flash or other solid state memory, and so forth.

Figure 2:
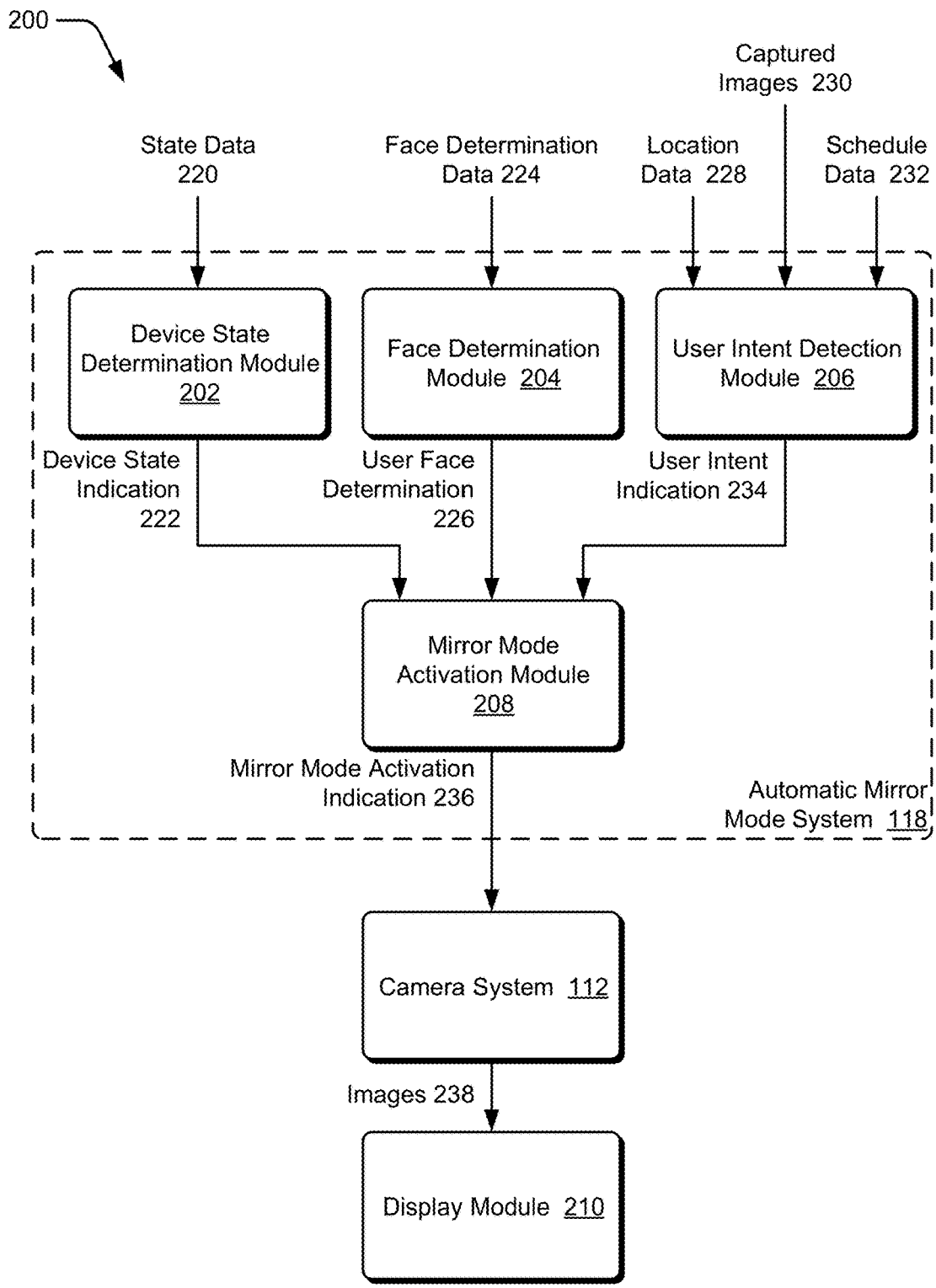
FIG. 2 illustrates an example implementing the techniques discussed herein.

FIG. 2 illustrates an example 200 implementing the techniques discussed herein. The example 200 includes the automatic mirror mode system 118, which includes a device state determination module 202, a face determination module 204, a user intent detection module 206, and a mirror mode activation module 208. The example 200 also includes a camera system 112 and a display module 210.

The device state determination module 202 implements functionality to determine whether the computing device 102 is currently in a state in which the mirror mode may be automatically activated. The device state determination module 202 determines a current state of the computing device 102 based on various state data 220. The device state determination module 202 obtains state data 220 and outputs a device state indication 222 to the mirror mode activation module. The device state determination module 202 can receive state data 220 from any of various components of the computing device 102, such as the operating system 108, processing system 106, an application 110, and so forth.

The device state determination module 202 receives any of a variety of state data 220 that may indicate whether to automatically activate the mirror mode for the computing device 102. In one or more implementations, the state data 220 includes an indication (e.g., from the operating system 108) of whether the computing device 102 is operating in a low power mode or is in a locked screen off state (the computing device 102 is locked and the display device is currently off (e.g., not displaying any content)). In the low power mode various power saving techniques are employed, such as reducing the frequency of a processor or processor core, powering down a processor or processor core, using only a dedicated low power processor or processor core, and so forth. In the locked screen off state the computing device 102 is locked (e.g., requiring user authentication to unlock the computing device 102) and the display device 104 is turned off.

Additionally or alternatively, the device state determination module 202 receives various other state data 220, such as an indication of which applications 110 are currently running or which application 110 is the currently active application, an indication of whether the camera system 112 is activated and capturing images, and so forth.

In one or more implementations, the device state determination module 202 determines as the device state indication 222 an indication of a current device state. For example, device state determination module 202 may include as the device state indication 222 the current state of the computing device 102, such as "operating in a low power mode" and "in a locked screen off state". By way of another example, device state determination module 202 may include as the device state indication 222 the current state of the computing device 102 "operating in a low power mode" and "camera system activated".

Additionally or alternatively, the device state determination module 202 determines as the device state indication 222 an indication of whether, based on the current state of the computing device 102, to automatically enter the mirror mode. This indication can be a Boolean value or other indication. The device state determination module 202 can use any of a variety of rules or criteria to determine whether to output a value as the device state indication 222 indicating to enter the mirror mode. For example, the device state determination module 202 may generate device state indication 222 as "True" or "1" indicating to enter the mirror mode if the computing device 102 is operating in a low power mode and is in a locked screen off state. By way of another example, the device state determination module 202 may generate device state indication 222 as "True" or "1" indicating to enter the mirror mode if the computing device 102 is operating in a low power mode and the camera system 112 is not activated. By way of another example, the device state determination module 202 may generate device state indication 222 as "False" or "0" indicating not to enter the mirror mode if the computing device 102 is operating in a low power mode but is not in a locked screen off state.

The face determination module 204 implements functionality to determine whether a user is facing the display device 104 and is close to the display device 104. The face determination module 204 receives face determination data 224 from any of various sources. For example, the face determination data 224 can be received from an accelerometer, a gyro sensor, an imaging device (e.g., a front-facing camera of camera system 112), combinations thereof, and so forth. The face determination module 204 analyzes the face determination data 224 to determine whether a user is facing the display device 104 and is close to the display device 104, and outputs a user face determination 226 indicating such.

The face determination module 204 can determine whether a user is facing the display device 104 and is close to the display device 104 in any of a variety of different manners. In one or more implementations, the face determination module 204 detects various facial features of the user, such as eyes, nose, mouth, and so forth to determine whether the user is facing (looking at) the display device 104. The face determination module 204 further determines whether the face of the user is within a threshold distance of the display device 104. The determination of whether the face of the user is within the threshold distance (e.g., 2 feet) can be made in various manners, such as by using a ranging sensor (e.g., Lidar) on the same surface of the computing device 102 as the display device 104 to determine how far the face of the user is from the display device 104, by determining whether the face of the user covers at least a threshold amount of a captured image (e.g., the user of the face is at least 40% of the captured image), and so forth. The face determination module 204 determines that the user is facing the display device 104 and is close to the display device 104 in response to these various facial features (or a subset thereof) being detected and the face of the user being determined to be within the threshold distance of display device 104, and outputs an indication of such as user face determination 226.

Additionally or alternatively, the face determination module 204 determines a viewing angle of the user and determines that the user is facing the display device 104 in response to the viewing angle being less than a threshold amount (e.g., less than 10%) and is close to the display device 104. The viewing angle is, for example, the difference in angle (relative to one or more axes) between the face of the user (e.g., a plane of the face of the user) and the display device 104 (e.g., a plane of the display device 104). When using the viewing angle, the face determination module 204 outputs a user face determination 226 indicating that the user is facing the display device 104 and is close to the display device 104 only if the viewing angle is less than the threshold amount.

In one or more implementations, the face determination module 204 uses a machine learning system to determine whether a user is facing the display device 104 and is close to the display device 104. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

The machine learning system is trained, for example, by using training data that is sets of data (e.g., any of the face determination data 224). Known labels are associated with the sets of data indicating whether or not the data indicates that a user is facing the display device and is close to the display device. The machine learning system is trained by updating weights or values of layers in the machine learning system to minimize the loss between determinations of whether the user is facing the display device and is close to the display device generated by the machine learning system for the training data and the corresponding known labels for the training data. Various different loss functions can be used in training the machine learning system, such as cross entropy loss, mean squared error loss, and so forth.

In one or more implementations the machine learning system is trained over time as the automatic mirror mode system 118 is used over time. E.g., the user can provide an indication of whether he is facing the display device and is close to the display device, and this indication can be used as a known label for the determination by the machine learning system of whether the user is facing the display device and is close to the display device and used to further train the machine learning system.

In one or more implementations, the face determination module 204 determines how many faces are viewing the display device 104, such as how many faces are detected in face determination data 224 (e.g., in captured images). For example, a user may be taking a selfie with a friend and the face determination module 204 may determine that both of their faces are facing the display device 104 and are close to the display device 104. The face determination module 204 can include in the user face determination 226 an indication of a number of faces that are facing the display device 104 and are close to the display device 104.

The user intent detection module 206 implements functionality to detect whether a user intent is to activate the mirror mode for the computing device 102. The user intent detection module 206 outputs a user intent indication 234 that indicates whether the user intent detection module 206 determines that the user intent is to activate the mirror mode. The user intent detection module 206 receives one or more of location data 228, captured images 230, and schedule data 232. The captured images are received, for example, from camera system 112 (e.g., a front-facing camera). The location data 228 and schedule data 232 are received from any of various sources, such as an application 110, the operating system 108, a remote (e.g., on-line) scheduling or calendaring system, and so forth.

In one or more implementations, the user intent detection module 206 analyzes captured images 230 to identify the user performing any of various actions that are facial interactions, such as showing their teeth, stroking their hair, playing with their beard or moustache, puffing their eyebrows, looking deep into their eyes, and so forth. These actions can be identified in any of a variety of different manners, such as identifying that the teeth of the user are visible in captured images 230, identifying that the fingers of the user are in their hair or beard in captured images 230, and so forth. The user intent detection module 206 determines that the user intent is to activate the mirror mode for the computing device 102 in response to the user performing one or more facial interactions.

Additionally or alternatively, in one or more implementations the user intent detection module 206 uses a machine learning system to determine whether a user is performing any facial interactions. The machine learning system is trained, for example, by using training data that is images (e.g., some with users performing facial interactions and some without users performing facial interactions). Known labels are associated with the images indicating whether the images include a user performing a facial interaction. The machine learning system is trained by updating weights or values of layers in the machine learning system to minimize the loss between determinations of whether or not the images include a user performing a facial interaction user generated by the machine learning system for the training data and the corresponding known labels for the training data. Various different loss functions can be used in training the machine learning system, such as cross entropy loss, mean squared error loss, and so forth.

The machine learning system of the user intent detection module 206 is optionally trained over time as the automatic mirror mode system 118 is used over time. E.g., the user can provide an indication of whether he was performing a facial interaction, and this indication can be used as a known label for the determination by the machine learning system of whether the user was performing a facial interaction and used to further train the machine learning system.

The user intent detection module 206 may also analyze schedule data 232 to identify whether the user intent is to activate the mirror mode of the computing device 102. The schedule data 232 refers to data that describes a schedule, calendar, plan, and so forth of the user. The schedule data 232 can be obtained from a local system or data store, a remote system or data store, user input, combinations thereof, and so forth. The schedule data 232 includes, for example, schedule data that describes one or more of the date, day of the week, time, location, type, and so forth of upcoming events for the user. These events can take various forms, such as meetings, appointments, conference calls, and so forth. These events can be of various types (e.g., in-person or video conference), can be held at various different locations, and so forth. The user intent detection module 206 determines that the user intent is to activate the mirror mode for the computing device 102 in response to a current time being just prior to an upcoming event.

In one or more implementations, the user intent detection module 206 determines that the current time is just prior to an upcoming event if the current time is less than a threshold amount of time prior to the scheduled start time of the upcoming event. This threshold amount of time can be fixed, such as 3 minutes or 5 minutes. Additionally or alternatively, this threshold amount of time can be variable based on the schedule data 232, such as 5 minutes for an in-person meeting, 2 minutes for a video conference, and so forth. Additionally or alternatively, this threshold amount of time can be specified by the user (e.g., via a user interface allowing the user to set preferences for the automatic mirror mode system 118).

Additionally or alternatively, in one or more implementations the user intent detection module 206 uses a machine learning system to determine whether the current time is just prior to an upcoming event. The machine learning system is trained, for example, by using training data that is schedule data for multiple events (e.g., having various different times, types, dates, days of the week, and so forth) and a training current time (this training current time may be the actual current time, or a different time set for the purposes of training). Known labels are associated with the events indicating whether the training current time is just prior to an upcoming event. Including training data with different dates and types allows the machine learning system to learn how to determine whether the current time is just prior to an upcoming event based on different types of events, different days of the week, and so forth. The machine learning system is trained by updating weights or values of layers in the machine learning system to minimize the loss between determinations of whether the training current time is just prior to an upcoming event generated by the machine learning system for the training data and the corresponding known labels for the training data. Various different loss functions can be used in training the machine learning system, such as cross entropy loss, mean squared error loss, and so forth.

The machine learning system of the user intent detection module 206 is optionally trained over time as the automatic mirror mode system 118 is used over time. E.g., the user can provide an indication of whether a current time is just prior to an upcoming event, and this indication can be used as a known label for the determination by the machine learning system of whether the training current time is just prior to an upcoming event and used to further train the machine learning system.

The user intent detection module 206 may also analyze location data 228 to identify whether the user intent is to activate the mirror mode of the computing device 102. The location data 228 refers to data that describes a location of the computing device 102. The location data 228 can be obtained from various location identification systems, such as a global positioning system (GPS), a Bluetooth Low Energy beacon detection system, a Wi-Fi or other wireless network analysis system, and so forth. The user intent detection module 206 determines that the user intent is to activate the mirror mode for the computing device 102 in response to a current location being one of various particular types of locations, such as right before the entrance of a meeting room, right before the entrance of a house, right before the entrance of party hall, right before the entrance of a mall, and so forth. These various particular types of locations can be determined in various different manners, such as from a local or remote map application or database, from user input (e.g., via a user interface allowing the user to specify particular locations), from locations specified in schedule data 232, and so forth.

In one or more implementations, the user intent detection module 206 determines that the current location is one of various particular types of locations if the current location is less than a threshold distance away from one of the various particular types of locations. This threshold distance can be fixed, such as 5 feet or 10 feet. Additionally or alternatively, this threshold distance can be variable based on the type of the particular location, such as 5 feet for a meeting room or house, 15 feet for a party hall or mall, and so forth. Additionally or alternatively, this threshold distance can be specified by the user (e.g., via a user interface allowing the user to set preferences for the automatic mirror mode system 118).

Additionally or alternatively, in one or more implementations the user intent detection module 206 uses a machine learning system to determine whether the current location is one of various particular types of locations. The machine learning system is trained, for example, by using training data that is location data for different particular types of locations and a training current location (this training current location may be the actual current location, or a different location set for the purposes of training). Known labels are associated with the various particular types of locations and training current locations indicating whether the training current location is one of the various particular types of locations. The machine learning system is trained by updating weights or values of layers in the machine learning system to minimize the loss between determinations of whether or not the training current location is one of various particular types of locations generated by the machine learning system for the training data and the corresponding known labels for the training data. Various different loss functions can be used in training the machine learning system, such as cross entropy loss, mean squared error loss, and so forth.

The machine learning system of the user intent detection module 206 is optionally trained over time as the automatic mirror mode system 118 is used over time. E.g., the user can provide an indication of whether a current location is one of various particular types of locations, and this indication can be used as a known label for the determination by the machine learning system of whether or not the training current location is one of various particular types of locations and used to further train the machine learning system.

The user intent detection module 206 also optionally accounts for locations where user intent is not to activate the mirror mode for the computing device 102, also referred to herein as excluded locations. Examples of such excluded locations include locations where a mirror is already typically available to the user (e.g., a bathroom, a gym or other exercise location, a dressing room), locations where using a camera is prohibited or discouraged due to privacy concerns (e.g., public bathrooms, public gyms or exercise locations), and so forth. Accordingly, the user intent detection module 206 can determine that the user intent is not to activate the mirror mode for the computing device 102 in response to the current location being is less than a threshold distance away (analogous to the discussion above regarding threshold distances) from one of these excluded locations. Additionally or alternatively, as part of the training of the machine learning system of the user intent detection module 206, the machine learning system can be trained to determine that the current location is not one of the various particular types of locations if the current location is one of the excluded locations.

The user intent detection module 206 can determine whether the user intent is to activate the mirror mode based on analysis of one or more of location data 228, captured images 230, and schedule data 232 as discussed herein. In one or more implementations, if the analysis of at least one of location data 228, captured images 230, and schedule data 232 indicates that the user intent is to activate the mirror mode, then the user intent detection module 206 outputs user intent indication 234 indicating that the user intent is to activate the mirror mode. Additionally or alternatively, the user intent detection module 206 outputs user intent indication 234 indicating that the user intent is to activate the mirror mode only if the analysis of two or more of location data 228, captured images 230, and schedule data 232 indicates that the user intent is to activate the mirror mode.

Various different machine learning systems that can be used by the user intent detection module 206 are discussed herein, one for analyzing location data 228, one for analyzing captured images 230, and one for analyzing schedule data 232. Additionally or alternatively, the user intent detection module 206 uses a single machine learning system that is trained using two or more of the location data 228, captured images 230, and schedule data 232. For example, a machine learning system can be trained by using training data that is sets of an image (e.g., with a user performing a facial interaction or without a user performing a facial interaction), schedule data for an event and a training current time, and a particular type of location and a training current location. Known labels are associated with each set of training data that indicates whether the user intent is to activate the mirror mode of the computing device 102.

The mirror mode activation module 208 implements functionality to activate the mirror mode for the computing device 102 based on one or more of the device state indication 222, the user face determination 226, and the user intent indication 234. In one or more implementations, the mirror mode activation module 208 determines to activate the mirror mode for the computing device 102 in response to: 1) the device state indication 222 indicating to automatically enter the mirror mode (or the device state indication 222 indicating a current device state that the mirror mode activation module 208 determines, analogous to the discussion above regarding device state determination module 202, is an indication to enter the mirror mode), 2) the user face determination 226 indicating the user is facing the display device 104 and is close to the display device 104, and 3) the outputs user intent indication 234 indicating that the user intent is to activate the mirror mode. Otherwise, the mirror mode activation module 208 determines not to activate the mirror mode for the computing device 102.

It should be noted that if the device state indication 222 is an indication of whether, based on the current state of the computing device 102, to automatically enter the mirror mode (e.g., a Boolean value), mirror mode activation module 208 uses that indication in determining whether to activate the mirror mode for the computing device 102. However, if the device state indication 222 is a current state of the computing device 102, the mirror mode activation module 208 can use any of a variety of rules or criteria to determine whether, based on the current state of the computing device 102, to automatically enter the mirror mode analogous to the determination made by device state determination module 202 as discussed above.

In one or more implementations, the mirror mode activation module 208 determines not to activate the mirror mode in situations in which the captured images include multiple faces. Accordingly, if the user face determination 226 indicates multiple faces, then the mirror mode activation module 208 determines not to activate the mirror mode for the computing device 102.

In response to determining to activate the mirror mode for the computing device 102, the mirror mode activation module 208 outputs a mirror mode activation indication 236. In response to the mirror mode activation indication 236, the camera system 112 enters the mirror mode. In the mirror mode, the camera system 112 captures images of the user (e.g., using a front-facing camera) and provides those images 238 to the camera system 112 for display on the display device 104. In one or more implementations, the images 238 are displayed on the display device 104 as soon as the images 238 are captured. Copies of the images 238 need not be maintained by the computing device 102 other than for purposes of displaying the images 238 while operating in the mirror mode.

In one or more implementations, the camera that captures images 238 is the same camera as captured one or both of the images included in the face determination data 224 and the captured images 230. Additionally or alternatively, the camera that captures images 238 is a different same camera as captured one or both of the images included in the face determination data 224 and the captured images 230. For example, the camera that captured one or both of the images included in the face determination data 224 and the captured images 230 may be a low power camera (or an infrared camera) whereas the camera that captures images 238 may be a higher power camera (or a regular camera capturing images in the visible light spectrum).

In one or more implementations, the camera system 112 does not display various image capture user interface elements typically associated with cameras. For example, a shutter button need not be displayed, image capture options (e.g., photograph, video, slow motion) need not be displayed, flash control (e.g., on, off, auto) need not be displayed, and so forth. Thus, the mirror mode provides images of the user (e.g., as if the user were looking in a mirror) and need not provide any additional inputs to allow the user to save images, control how images are captured, and so forth.

Figure 3:
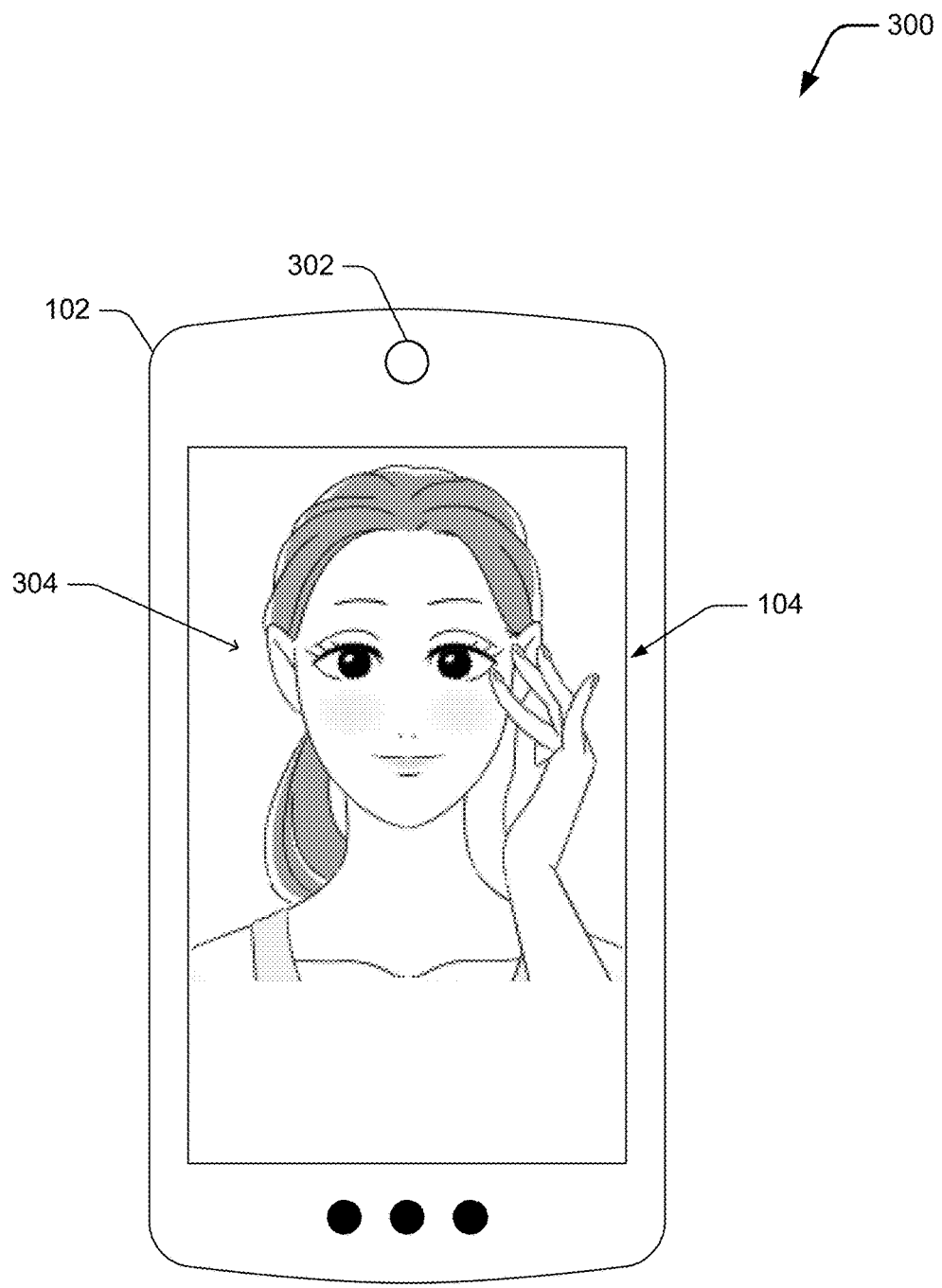
FIG. 3 illustrates an example of the usage of the techniques discussed herein.

FIG. 3 illustrates an example 300 of the usage of the techniques discussed herein. In the example 300, a computing device 102 includes a front-facing camera 302 (e.g., part of camera system 112). In response to determining to activate the mirror mode for the computing device 102, the camera system 112 captures an image 304 and displays the image 304 on the display device 104. As illustrated, the image 304 is of a person performing a facial interaction (e.g., adjusting makeup or a mark near her eye).

Returning to FIG. 2, it should be noted that in one or more implementations the computing device 102, including automatic mirror mode system 118, while determining whether to activate mirror mode for the computing device 102 can operate in a low power mode using any of the power saving techniques discussed above. In response to determining to activate mirror mode for the computing device 102, the computing device 102 can transition to a higher power mode (e.g., activating the display device 104, activating a higher power processor or processor core, and so forth). The transition to the higher power mode can be made, for example, by the mirror mode activation module 208 providing the mirror mode activation indication 236 to the operating system 108 or other component that manages power modes in the computing device 102.

In one or more implementations, the analysis performed by device state determination module 202, face determination module 204, user intent detection module 206, and mirror mode activation module 208 is performed in response to various inputs, such as an accelerometer or a gyro sensor indicating that the computing device 102 has been moved and is at an angle consistent with a user looking at the display device 104 (e.g., the computing device 102 is within a threshold amount, such as 20 degrees, of being vertical). Accordingly, power need not be extended by automatic mirror mode system 118 determining whether to activate the mirror mode for the computing device 102 unless it is possible that the user intends to activate the mirror mode.

Furthermore, ones of the modules 204, 206, and 208 need not perform any actions until receiving appropriate input from another of the modules 202, 204, and 206. For example, accelerometer or gyro sensor data indicating that the computing device 102 has been moved (and optionally is at an angle consistent with a user looking at the display device 104) can cause device state determination module 202 to begin analyzing state data 220. Device state indication 222 indicating to enter the mirror mode can cause face determination module 204 to begin analyzing face determination data 224. User face determination 226 indicating that a user is facing the display device and is close to the display device can cause user intent detection module 206 to begin analyzing one or more of location data 228, captured images 230, and schedule data 232. User intent indication 234 indicating that the user intent is to activate the mirror mode can cause the mirror mode activation module 208 to determine whether to activate the mirror mode. Accordingly, energy, processor, and other resources need not be expended by face determination module 204 unless device state indication 222 indicating to enter the mirror mode, need not be expended by user intent detection module 206 unless user face determination 226 indicates that a user is facing the display device and is close to the display device, and need not be expended by mirror mode activation module 208 unless user intent indication 234 indicates that the user intent is to activate the mirror mode.

Additionally, in situations in which ones of the modules 204, 206, and 208 do not perform any actions until receiving appropriate input from another of the modules 202, 204, and 206, the mirror mode activation module 208 need not receive device state indication 222 or a user face determination 226. Rather, mirror mode activation module 208 can rely on user intent indication 234 to determine whether to activate mirror mode for the computing device 102 knowing that mirror mode activation module 208 would not receive user intent indication 234 indicating that the user intent is to activate the mirror mode unless device state indication 222 indicated to enter the mirror mode and user face determination 226 indicated that a user is facing the display device and is close to the display device.

The computing device 102 remains in mirror mode until a determination is made to deactivate mirror mode. This determination can be made by the automatic mirror mode system 118 or another component of the computing device 102 (e.g., the operating system 108). This determination can be made based on various different actions or inputs, such as a user input (e.g., touchscreen gesture, selection of a button, audio input) indicating to deactivate mirror mode, the phone being put away (e.g., stowed in a pocket or purse, placed on a table), a certain amount of time elapsing (e.g., 30 seconds), the current time being the same as or within a threshold amount of an event (e.g., the starting time of a meeting or conference call indicated in schedule data 232), and so forth. In one or more implementations, after activating mirror mode the automatic mirror mode system 118 continues to determine whether to activate the mirror mode for the computing device 102 as discussed above. In response to determining that mirror mode should not be activated (e.g., device state indication 222 no longer indicating to enter the mirror mode, user face determination 226 no longer indicating that a user is facing the display device and is close to the display device, user intent indication 234 indicating that the user intent is no longer to activate the mirror mode) the mirror mode activation module 208 provides a deactivation indication causing the computing device 102 to deactivated mirror mode (e.g., images 238 are no longer captured by a front-facing camera of the camera system 112 and displayed by the display module 210).

Thus, the automatic mirror mode system 118 automatically activates a mirror mode for the computing device 102 in response to determining that a user intent is to activate the mirror mode. The user need not unlock the computing device 102, need not navigate through different user interface screens to activate the camera or switch the camera to the front-facing camera, and so forth. Rather, the user can, for example, simply raise the computing device 102 in front of his face and begin performing a facial interaction.

Figure 4:
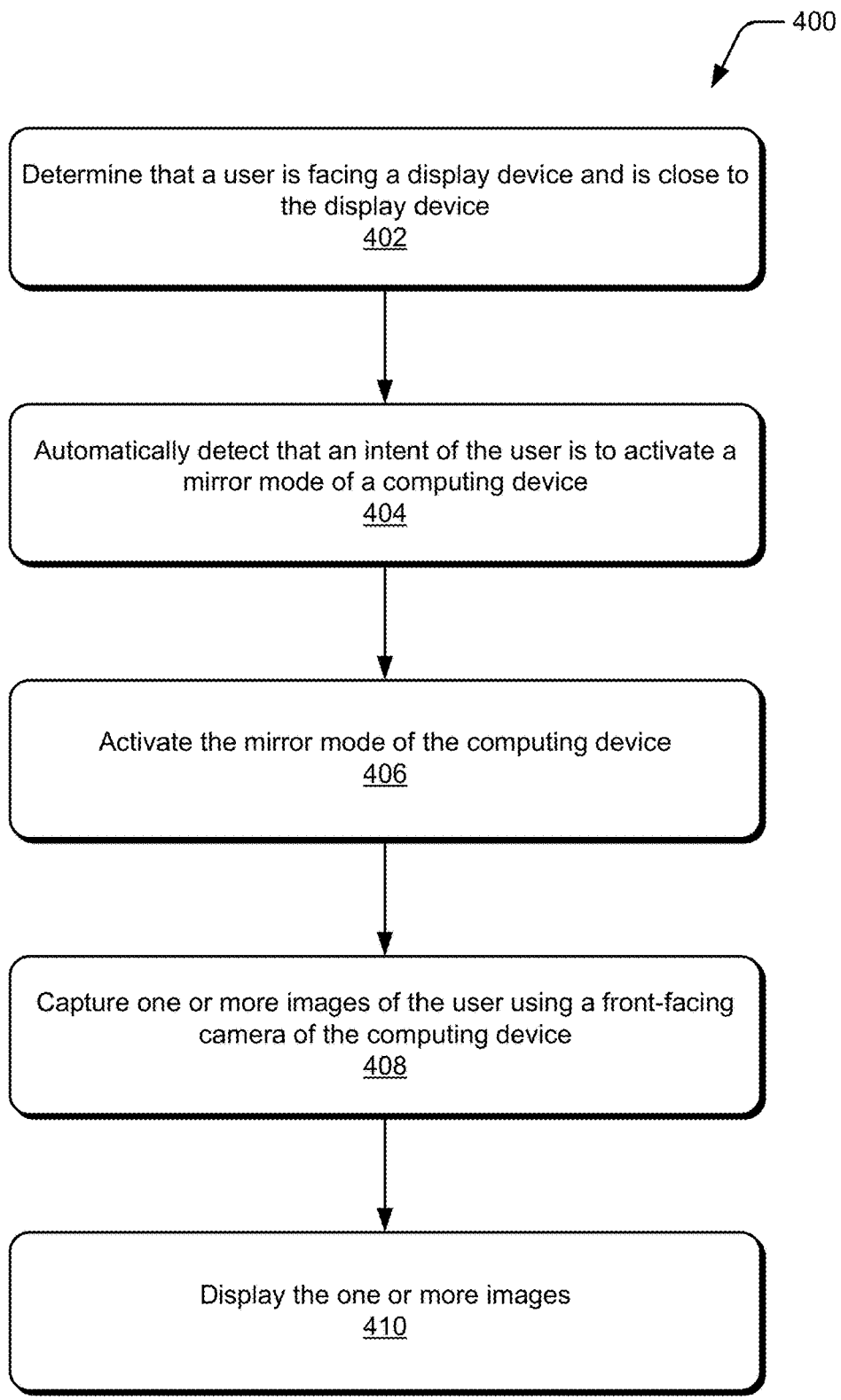
FIG. 4 illustrates an example process for implementing the techniques discussed herein in accordance with one or more embodiments.

FIG. 4 illustrates an example process 400 for implementing the techniques discussed herein in accordance with one or more embodiments. Process 400 is carried out by an automatic mirror mode system, such as automatic mirror mode system 118 of FIG. 1 or FIG. 2, and can be implemented in software, firmware, hardware, or combinations thereof. Process 400 is shown as a set of acts and is not limited to the order shown for performing the operations of the various acts.

In process 400, a determination is made as to whether a user is facing a display device and is close to the display device (act 402). This determination can be made in various manners, such as identifying facial features of the user, determining a distance between the user and the display device, determining a viewing angle of the user, using a trained machine learning system, and so forth.

An intent of the user to activate a mirror mode of a computing device is automatically detected (act 404). The computing device includes, for example, the display device. The intent of the user can be determined in various manners, such as based on facial interactions of the user, a current location of the computing device, a current time, and so forth.

The mirror mode of the computing device is activated in response to determining that the user is facing the display device, that the user is close to the display device, and detecting that an intent of the user is to activate the mirror mode of the computing device (act 406).

While in the mirror mode, one or more images of the user are captured (act 408). These images are captured using a camera on the same surface or face of the computing device as the display device (e.g., by a front-facing camera of the computing device). The captured one or more images are displayed on the display device (act 410).

Figure 5:
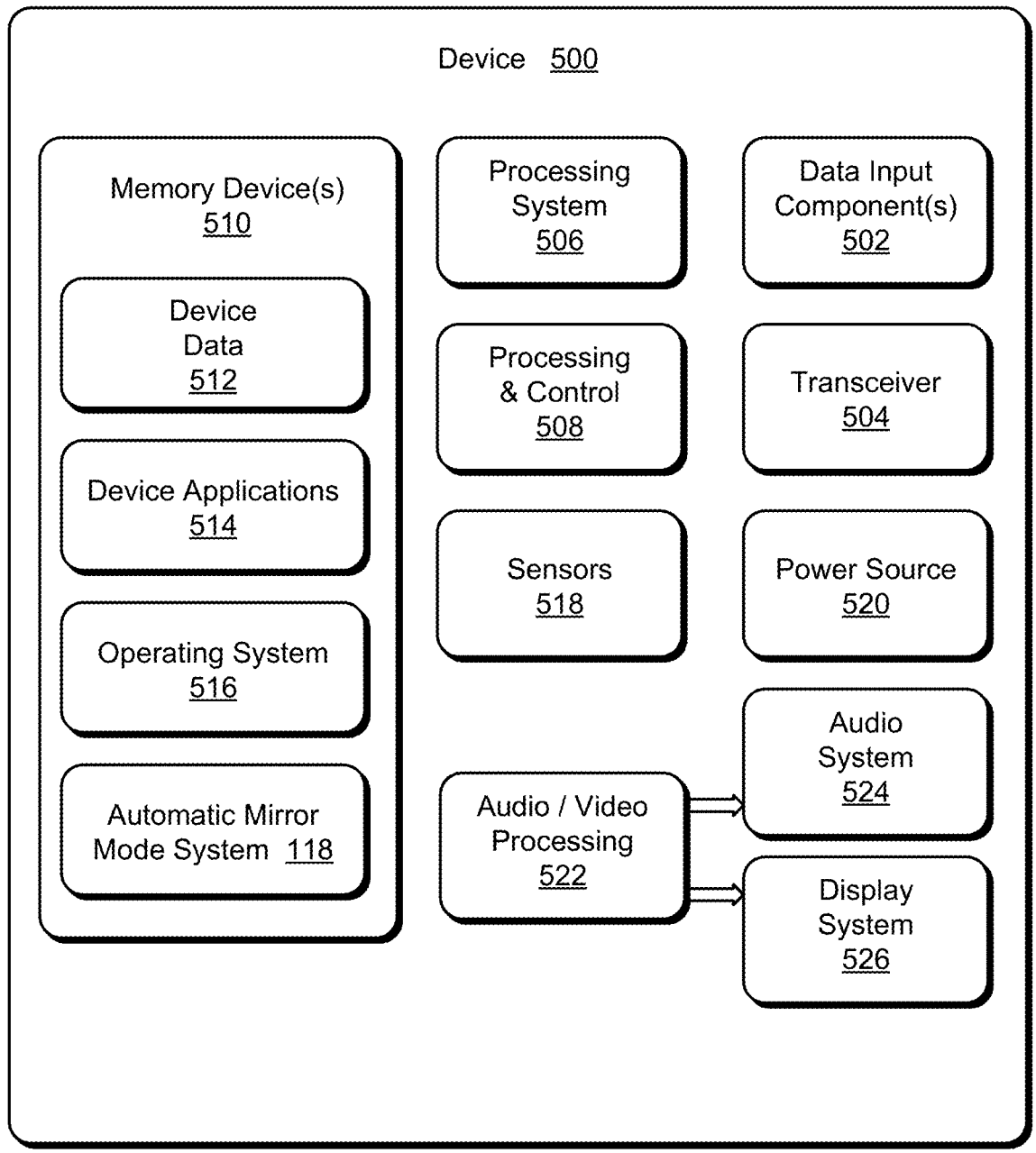
FIG. 5 illustrates various components of an example electronic device that can implement embodiments of the techniques discussed herein.

FIG. 5 illustrates various components of an example electronic device that can implement embodiments of the techniques discussed herein. The electronic device 500 can be implemented as any of the devices described with reference to the previous FIGS., such as any type of client device, mobile phone, tablet, computing, communication, entertainment, gaming, media playback, or other type of electronic device. In one or more embodiments the electronic device 500 includes the automatic mirror mode system 118, described above.

The electronic device 500 includes one or more data input components 502 via which any type of data, media content, or inputs can be received such as user-selectable inputs, messages, music, television content, recorded video content, and any other type of text, audio, video, or image data received from any content or data source. The data input components 502 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 502 may also include various other input components such as microphones, touch sensors, touchscreens, keyboards, and so forth.

The device 500 includes communication transceivers 504 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 500 includes a processing system 506 of one or more processors (e.g., any of microprocessors, controllers, and the like) or a processor and memory system implemented as a system-on-chip (SoC) that processes computer-executable instructions. The processing system 506 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 508. The device 500 may further include any type of a system bus or other data and command transfer system that couples the various components within the device. A system bus can include any one or combination of different bus structures and architectures, as well as control and data lines.

The device 500 also includes computer-readable storage memory devices 510 that enable data storage, such as data storage devices that can be accessed by a computing device, and that provide persistent storage of data and executable instructions (e.g., software applications, programs, functions, and the like). Examples of the computer-readable storage memory devices 510 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory device 510 provides data storage mechanisms to store the device data 512, other types of information or data, and various device applications 514 (e.g., software applications). For example, an operating system 516 can be maintained as software instructions with a memory device and executed by the processing system 506. The device applications 514 may also include a device manager, such as any form of a control application, software application, signal-processing and control module, code that is native to a particular device, a hardware abstraction layer for a particular device, and so on.

The device 500 can also include one or more device sensors 518, such as any one or more of an ambient light sensor, a proximity sensor, a touch sensor, an infrared (IR) sensor, accelerometer, gyroscope, thermal sensor, audio sensor (e.g., microphone), and the like. The device 500 can also include one or more power sources 520, such as when the device 500 is implemented as a mobile device. The power sources 520 may include a charging or power system, and can be implemented as a flexible strip battery, a rechargeable battery, a charged super-capacitor, or any other type of active or passive power source.

The device 500 additionally includes an audio or video processing system 522 that generates one or both of audio data for an audio system 524 and display data for a display system 526. In accordance with some embodiments, the audio/video processing system 522 is configured to receive call audio data from the transceiver 504 and communicate the call audio data to the audio system 524 for playback at the device 500. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for automatically activating a mirror mode of a computing device have been described in language specific to features or methods, the subject of the appended claims is not necessarily limited to the specific features or methods described. Rather, the specific features and methods are disclosed as example implementations of techniques for implementing automatically activating a mirror mode of a computing device. Further, various different embodiments are described, and it is to be appreciated that each described embodiment can be implemented independently or in connection with one or more other described embodiments. Additional aspects of the techniques, features, and/or methods discussed herein relate to one or more of the following:

A method comprising: determining that a user is facing a display device and is close to the display device; automatically detecting that an intent of the user is to activate a mirror mode of a computing device; activating, in response to determining that the user is facing the display device and is close to the display device and detecting that an intent of the user is to activate the mirror mode of the computing device, the mirror mode of the computing device; and while the mirror mode of the computing device is activated, capturing first one or more images of the user using a front-facing camera of the computing device and displaying the one or more images on the display device.

Alternatively or in addition to the above described method, any one or combination of the following. The automatically detecting comprises capturing second one or more images of the user using the front-facing camera, determining whether a face of the user covers a threshold amount of at least one image of the second one or more images, and detecting that the user is close to the display device in response to the face of the user covering at least the threshold amount of the at least one image. The automatically detecting comprises determining that the user is performing an action that is a facial interaction. The action including one or more of showing teeth, stroking hair, playing with a beard or moustache, puffing eyebrows, and looking deep into eyes of the user. The automatically detecting comprises identifying that a current time is less than a threshold amount of time before a scheduled start time of an event for the user. The automatically detecting comprises identifying, using a machine learning system, that a current time is just prior to a scheduled start time of an event for the user. The automatically detecting comprises identifying a current location of the computing device is less than a threshold distance away from one of multiple particular types of locations. The particular types of locations including an entrance of a meeting room, an entrance of a house, an entrance of a party hall, an entrance of a shop, and an entrance of a mall. The automatically detecting comprises determining that the user is performing an action that is a facial interaction and that a current time is just prior to a scheduled start time of an event for the user. The automatically detecting comprises determining that the user is performing an action that is a facial interaction and that a current location of the computing device is less than a threshold distance away from one of multiple particular types of locations. The method further comprising determining that the computing device is running in a low power mode, and the activating including activating the mirror mode in response to determining that the user is facing the display device and is close to the display device and detecting that an intent of the user is to activate the mirror mode of the computing device and detecting that the computing device is running in the low power mode. The method further comprising determining that the computing device is in a locked screen off state, and the activating including activating the mirror mode in response to determining that the user is facing the display device and is close to the display device and detecting that an intent of the user is to activate the mirror mode of the computing device and detecting that the computing device is in the locked screen off state. The determining that the user is facing the display device including determining that an angle between a plane of the face of the user and a plane of the display device is less than a threshold amount.

A computing device comprising: a front-facing camera; a front-facing display device; a viewing angle determination module, implemented at least in part in hardware, to determine that a user is facing a display device; a user intent detection module, implemented at least in part in hardware, to automatically detect that an intent of the user is to activate a mirror mode of a camera system; a mirror mode activation module, implemented at least in part in hardware, to activate, in response to determining that the user is facing the display device and detecting that an intent of the user is to activate the mirror mode of the camera system, the mirror mode of the camera system, the camera system capturing one or more images of the user using the front-facing camera while the mirror mode of the camera system is activated; and a display module, implemented at least in part in hardware, to display the one or more images on the display device.

Alternatively or in addition to the above described computing device, any one or combination of the following. Wherein to automatically detect that the intent of the user is to activate the mirror mode is to determine that the user is performing an action that is a facial interaction. Wherein to automatically detect that the intent of the user is to activate the mirror mode is to identify that a current time is less than a threshold amount of time before a scheduled start time of an event for the user. Wherein to automatically detect that the intent of the user is to activate the mirror mode is to identify, using a machine learning system, that a current time is just prior to a scheduled start time of an event for the user. Wherein to automatically detect that the intent of the user is to activate the mirror mode is to identify a current location of the computing device is less than a threshold distance away from one of multiple particular types of locations.

A computing device comprising: a processor implemented in hardware; a camera system including a front-facing camera; a display device; and a computer-readable storage medium having stored thereon multiple instructions that, responsive to execution by the processor, cause the processor to perform acts including: determining that a user is facing the display device and is close to the display device; automatically detecting that an intent of the user is to activate a mirror mode of the computing device; activating, in response to determining that the user is facing the display device and is close to the display device and detecting that an intent of the user is to activate the mirror mode of the computing device, the mirror mode of the computing device; and while the mirror mode of the computing device is activated, capturing first one or more images of the user using the front-facing camera and displaying the one or more images on the display device.

Alternatively or in addition to the above described computing device, any one or combination of the following. Wherein the automatically detecting comprises determining that the user is performing an action that is a facial interaction.

What is claimed is:

1. A method comprising:
   determining that a user is facing a display device and is close to the display device;
   automatically detecting that an intent of the user is to activate a mirror mode of a computing device;
   activating, in response to determining that the user is facing the display device and is close to the display device and detecting that an intent of the user is to activate the mirror mode of the computing device; and
   while the mirror mode of the computing device is activated, capturing first one or more images of the user using a front-facing camera of the computing device and displaying the one or more images on the display device.

2. The method as described in claim 1, wherein the automatically detecting comprises capturing second one or more images of the user using the front-facing camera, determining whether a face of the user covers a threshold amount of at least one image of the second one or more images, and detecting that the user is close to the display device in response to the face of the user covering at least the threshold amount of the at least one image.

3. The method as described in claim 1, wherein the automatically detecting comprises determining that the user is performing an action that is a facial interaction.

4. The method as described in claim 3, the action including one or more of showing teeth, stroking hair, playing with a beard or moustache, puffing eyebrows, and looking deep into eyes of the user.

5. The method as described in claim 1, wherein the automatically detecting comprises identifying that a current time is less than a threshold amount of time before a scheduled start time of an event for the user.

6. The method as described in claim 1, wherein the automatically detecting comprises identifying, using a machine learning system, that a current time is just prior to a scheduled start time of an event for the user.

7. The method as described in claim 1, wherein the automatically detecting comprises identifying a current location of the computing device is less than a threshold distance away from one of multiple particular types of locations.

8. The method as described in claim 7, the particular types of locations including an entrance of a meeting room, an entrance of a house, an entrance of a party hall, an entrance of a shop, and an entrance of a mall.

9. The method as described in claim 1, wherein the automatically detecting comprises determining that the user is performing an action that is a facial interaction and that a current time is just prior to a scheduled start time of an event for the user.

10. The method as described in claim 1, wherein the automatically detecting comprises determining that the user is performing an action that is a facial interaction and that a current location of the computing device is less than a threshold distance away from one of multiple particular types of locations.

11. The method as described in claim 1, further comprising determining that the computing device is running in a low power mode, and the activating including activating the mirror mode in response to determining that the user is facing the display device and is close to the display device and detecting that an intent of the user is to activate the mirror mode of the computing device and detecting that the computing device is running in the low power mode.

12. The method as described in claim 1, further comprising determining that the computing device is in a locked screen off state, and the activating including activating the mirror mode in response to determining that the user is facing the display device and is close to the display device and detecting that an intent of the user is to activate the mirror mode of the computing device and detecting that the computing device is in the locked screen off state.

13. The method as described in claim 1, the determining that the user is facing the display device including determining that an angle between a plane of the face of the user and a plane of the display device is less than a threshold amount.

14. A computing device comprising:
    a front-facing camera;
    a front-facing display device;
    a viewing angle determination module, implemented at least in part in hardware, to determine that a user is facing a display device;
    a user intent detection module, implemented at least in part in hardware, to automatically detect that an intent of the user is to activate a mirror mode of a camera system;
    a mirror mode activation module, implemented at least in part in hardware, to activate, in response to determining that the user is facing the display device and detecting that an intent of the user is to activate the mirror mode of the camera system, the camera system capturing one or more images of the user using the front-facing camera while the mirror mode of the camera system is activated; and
    a display module, implemented at least in part in hardware, to display the one or more images on the display device.

15. The computing device as described in claim 14, wherein to automatically detect that the intent of the user is to activate the mirror mode is to determine that the user is performing an action that is a facial interaction.

16. The computing device as described in claim 14, wherein to automatically detect that the intent of the user is to activate the mirror mode is to identify that a current time is less than a threshold amount of time before a scheduled start time of an event for the user.

17. The computing device as described in claim 14, wherein to automatically detect that the intent of the user is to activate the mirror mode is to identify, using a machine learning system, that a current time is just prior to a scheduled start time of an event for the user.

18. The computing device as described in claim 14, wherein to automatically detect that the intent of the user is to activate the mirror mode is to identify a current location of the computing device is less than a threshold distance away from one of multiple particular types of locations.

19. A computing device comprising:
   a processor implemented in hardware;
   a camera system including a front-facing camera;
   a display device; and
   a computer-readable storage medium having stored thereon multiple instructions that, responsive to execution by the processor, cause the processor to perform acts including:
      determining that a user is facing the display device and is close to the display device;
      automatically detecting that an intent of the user is to activate a mirror mode of the computing device;
      activating, in response to determining that the user is facing the display device and is close to the display device and detecting that an intent of the user is to activate the mirror mode of the computing device; and
      while the mirror mode of the computing device is activated, capturing first one or more images of the user using the front-facing camera and displaying the one or more images on the display device.

20. The computing device as described in claim 19, wherein the automatically detecting comprises determining that the user is performing an action that is a facial interaction.

* * * * *